United States Patent [19]

Clausen et al.

[11] 4,107,372
[45] Aug. 15, 1978

[54] COMPOSITE

[75] Inventors: Victor H. Clausen, Vancouver, Wash.; Lester C. Brenno, Woodside, Calif.

[73] Assignee: H. B. Fuller Company, St. Paul, Minn.

[21] Appl. No.: 499,651

[22] Filed: Aug. 22, 1974

[51] Int. Cl.² .............................................. B32B 7/00
[52] U.S. Cl. .................................... 428/256; 156/178; 156/291; 428/138; 428/195
[58] Field of Search .................... 52/445, 454; 161/79, 161/88, 89, 109, 112, 113, 213; 428/109, 131, 209, 211, 256, 138, 198, 195; 156/178, 291

[56] References Cited

U.S. PATENT DOCUMENTS

| 1,699,967 | 1/1929 | Hicks | 52/445 |
|---|---|---|---|
| 1,882,747 | 10/1932 | Benedict | 52/454 |
| 1,972,639 | 9/1934 | Bailey | 52/454 |
| 1,983,994 | 12/1934 | Raynor | 52/454 |
| 2,020,908 | 11/1935 | Scammell | 52/454 |
| 2,103,897 | 12/1937 | Edge | 52/454 |
| 2,355,333 | 8/1944 | Sandell | 52/454 |
| 2,929,239 | 3/1960 | Dahlhauser et al. | 52/454 |
| 3,073,066 | 1/1963 | Edwards et al. | 52/454 |
| 3,308,591 | 3/1967 | Goldsworthy | 52/454 |
| 3,376,629 | 4/1968 | Baumann et al. | 52/454 |

Primary Examiner—James J. Bell
Attorney, Agent, or Firm—Merchant, Gould, Smith, Edell, Welter & Schmidt

[57] ABSTRACT

Composites which comprise a substrate (such as paper) to which a mesh (e.g. chicken wire) is firmly clasped by means of a plurality of retaining bands that overlie the mesh and are bonded to the substrate through holes in the mesh. The composites are useful as, for example, a backing for stucco and plaster walls.

10 Claims, 3 Drawing Figures

COMPOSITE

BACKGROUND OF THE INVENTION

There are many instances in which a mesh (e.g. a wire mesh) is used to support, anchor, reinforce or shape a hardenable material such as plaster or concrete or certain curable plastics. One such use is in the constructure of stucco walls.

In the construction of stucco walls, it is common to attach a moisture barrier such as a building paper to a wall and then fasten a wire mesh or other perforate material over the building paper. Subsequently, the soft or uncured stucco is applied over the wire mesh lath and allowed to harden in place to thereby become firmly bonded to the wire mesh and anchored to the wall. A number of variations of this process have been suggested and used.

However, the increasingly high labor costs for field application of wire mesh and building paper have forced lath manufactures to devise ways of combining the two at the factory so that they can be applied to studs or furring strips or sheathing in one direction. In one example of such a composite, a welded, rectangular wire lath is joined with building paper by means of a mechanical interlocking system in which horizontal wires were sandwiched between a sheet of uncoated kraft paper and a sheet of building paper that was bonded to the kraft paper after positioning the wires. Perforations in the kraft paper exposed the horizontal wires and those exposed wires were welded to vertical wires to mechanically form the paper/rectangular wire lath composite. In another type of composite, parallel wires were sandwiched between kraft paper and building paper. Intermittently, the wires projected through the kraft paper so that they could later be twisted with and thereby interlocked with a hexagonally patterned wire mesh.

Continuing attempts have been made to reduce the cost of stucco lath manufacture by producing improved composite products. More recently, one product has been developed which has gained commercial significance in the U.S. In that product, building paper is bonded to a wire mesh or lath by means of small shots of hot melt adhesive applied at intervals over one of the twisted wires which make up the wire lath to thereby directly bond the wire mesh to the paper web. In a typical instance, about (4) one-gram shots of hot melt adhesive would be used per square foot of composite. Although this type of composite is a significant improvement over some of the earlier composites, it is not without its problems. Among the various problems that have been reported are the following:

(1) The system is relatively more expensive than desired.

(2) The hot melt adhesives must be carefully selected. If the hot melt adhesives are too soft at elevated temperatures, the composite can delaminate under hot summer conditions. On the other hand, if the hot melt adhesives are too hard at low temperatures, they will tend to crack under cold winter conditions.

(3) The commercially used spacing of the hot melt adhesives allows some motion of the paper away from the lath so that excessive amounts of stucco are sometimes required to cover the lath adequately. More adhesive could be used, but this would increase costs and increase the problems described in subparagraph 4 hereof.

(4) Sometimes the hot melt adhesives used on the mesh so rigidly hold the mesh to the backing paper that if the backing paper becomes very dry in a hot afternoon summer sun the paper can shrink to such an extent that the resulting stresses exceed the strength of the bonding system and failure occurs either in the paper or in the hot melt adhesive, or at the interface of the two.

(5) Current manufacturing processes used in making this type of composite are relatively slow (e.g. 50 feet per minute).

Accordingly, there exists a need for an improved composite which would reduce or eliminate some of the problems associated with prior art composites.

SUMMARY OF THE INVENTION

The present invention is an improved composite and method for manufacture.

Briefly described, a preferred form of the present invention involves a composite that includes:

(a) a substrate such as paper;

(b) a mesh overlying the substrate (e.g. a hexagonal wire mesh); and (c) a plurality of retaining bands (e.g. adhesive-coated strands) overlying the mesh and bonded to the substrate through holes in the mesh, thereby fastening the mesh to the substrate.

In a preferred embodiment, the retaining bands are adhesive-coated strands (e.g. a continuous, untwisted, nylon filament or bundle of filaments).

Utilization of the present invention in its various forms will typically result in achieving one or more of the following benefits:

(1) reduced costs relative to present commercial processes for manufacturing composites of this type;

(2) higher manufacturing speeds than those currently being used;

(3) better distribution of stresses under changing conditions of temperature and humidity;

(4) limited independent motion of the substrate relative to the mesh;

(5) reduced weight.

THE DRAWINGS

DETAILED DESCRIPTION

As previously indicated, the composites of the present invention involve three essential components. These are the substrate, the mesh, and the retaining bands which overlie the mesh and clasp the mesh against the substrate.

Figure 1:
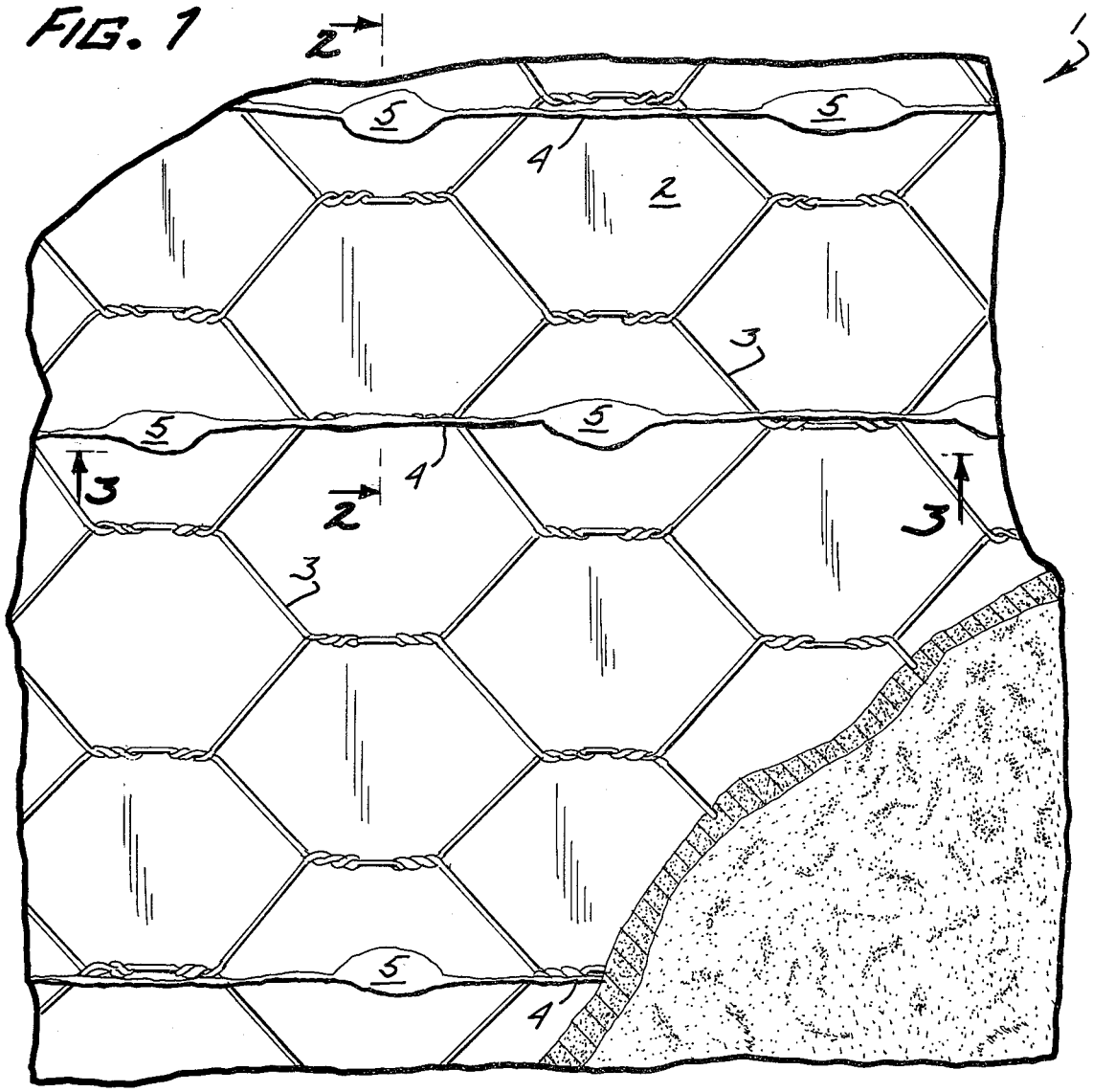
FIG. 1 is a fragmentary plan view of a composite made according to the present invention.

The general nature of this composite is illustrated in FIG. 1 in which the composite is generally indicated by the numberal 1. The composite comprises a substrate 2. A wire mesh 3 overlies substrate 2. The wire mesh 3 is clasped against the substrate by means of retaining bands 4 which overlie mesh 3 and are periodically bonded to the substrate through holes or openings in the mesh 3. The areas of bonding of these retaining bands are generally indicated by the numerals 5.

Figure 2:
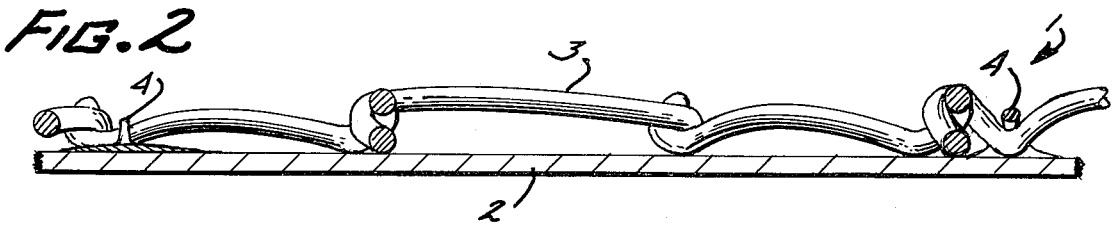
FIG. 2 is a cross sectional view of the composite of FIG. 1 taken along the line 2—2 in the direction of the arrows.
Figure 3:
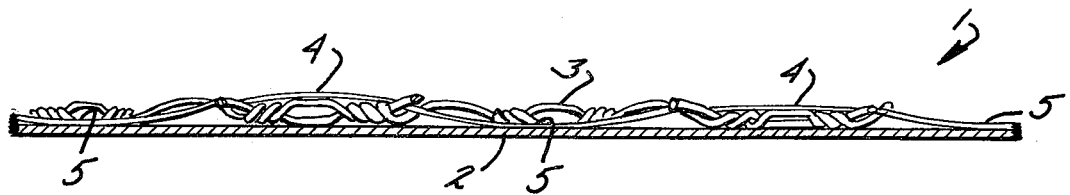
FIG. 3 is a cross sectional view of the composite of FIG. 1 as taken along the line 3—3 in the direction of the arrows.

The general relationship of retaining bands 4, wire mesh 3, and substrate 2 are shown in further detail in FIGS. 2 and 3.

As can be appreciated from a careful inspection of FIGS. 1 and 3, the retaining bands 4 are not ordinarily bonded to the mesh 3, but rather pass over the mesh and are intermittently bonded at areas 5 to the substrate 2. In this fashion, some relative movement between the mesh 3 and the substrate 2 can occur. Consequently, expansion and contraction of elements 2 and 3 relative to each other can occur without creating intolerable stresses.

Materials of Construction

Substrates

As shown in FIGS. 1-3, the composite 1 of the present invention includes a substrate 2. A variety of materials can be used as the substrate, although all do not serve with equal effectiveness in each application. An appropriate substrate will be selected based upon a consideration of such factors as cost, conditions of intended use, moisture and chemical resistance, heat stability, and method of bonding to be used between the retaining bands and the substrate. Suitable substrates include coated and uncoated paper (e.g. kraft paper), building paper, metal, plastic sheeting (e.g. thermoplastic vinyl sheeting), and the like. If desired, the substrate may be formed from several different materials in combination (e.g. a laminate of paper and vinyl sheeting). For many purposes, particularly in the manufacture of stucco walls, the use of a paper substrate (e.g. an asphalt impregnated kraft paper) is preferred.

Although the substrate may take other physical forms, the use of a substrate in the form of sheets or webs is preferred. For example, rolls of paper can be conviently used for the continuous production of composites of a type suitable for use in manufacturing stucco walls.

The Mesh

The principal purpose of the mesh in most end-use applications is to provide a skeleton or framework which can be attached to, for example, a wall and which will thereafter provide a means for firmly attaching and reinforcing a finishing material such as Portland cement, plaster, or other hardenable coatings to the wall. The mesh may be constructed of a variety of materials, although all do not serve with equal effectiveness. Typically, the mesh will have open areas totalling more than 50% of the total area of the mesh. More commonly, this open area will amount to more than 60% (e.g. more than 90%) on the same basis. Metal and plastic are suitable materials of construction. Because of its inherent rigidity and strength, metal mesh (e.g. expanded metal or wire mesh) is preferred.

The Retaining Bands

The purpose of the retaining bands is to hold the mesh onto the substrate. Accordingly, the retaining bands will necessarily be selected based upon such factors as cost, strength, ease of bonding to the substrate, and the like. A variety of materials and shapes can be used for the retaining bands, although all do not serve with equal effectiveness. As a general rule, it has been found that improved results are obtained as the cross sectional area of the retaining bands is reduced. The retaining bands can be made in the form of narrow strands, tapes, filaments, bundles of filaments, rovings, yarns, strings, cords, and the like.

Retaining bands in the form of untwisted bundles of filaments are preferred, particularly when the filaments are made of organic polymeric materials such as nylon or polyester. These and similar organic polymeric materials have some degree of "elasticity" (elongation at break), whether or not they may be elastomers. Nonelastomeric organic polymeric filaments can still be significantly more elastic or stretchable than essentially inelastic materials such as glass fibers. As will be explained subsequently, elasticity of the bands can help to relieve stresses in the composite.

Manufacture of the Composite

A variety of techniques can be used to manufacture the composites of the present invention. The manufacturing procedure will vary depending upon the nature and quality of each of the components of the composite, as well as the shape of the desired composite.

For ease in manufacture, it is common to use a plurality of retaining bands in a generally parallel relationship. These retaining bands are each bonded to the substrate through periodic holes in the mesh to thereby fasten the mesh to the substrate. The method of bonding can vary. For example, if the substrate is a thermoplastic or partially cured thermosetting plastic, the retaining bands can be made of the same or a compatible thermoplastic or partially cured thermoset plastic and bonding accomplished merely by fusing the retaining bands with the substrate at the desired loci of attachment by means of, for example, a heated metal shoe (not shown).

Alternatively, if the retaining bands are used in the form of narrow tapes, the underside of the tape or the face of the substrate can be coated with an adhesive that is appropriately activated (e.g. by contact or heat or solvent) at the desired loci of attachment.

In a particularly preferred embodiment, the retaining bands will be used in the form of an adhesive coated strand, preferably untwisted. If the adhesive employed is a hot melt adhesive, it can be suitably activated at the desired loci of attachment by means of a heated shoe that presses the adhesive coated strand against the substrate at the desired locus of attachment, followed by a cold shoe which sets the adhesive while the strand is held against the substrate.

The strength of the resulting composite will vary depending upon the strength and rigidity of the substrate, the strength and rigidity of the mesh, the strength of the retaining bands, the spacing of the bands, and the number and strength of the bonds between the bands and the substrate.

The present invention is further illustrated by the following description.

A composite suitable for use in the manufacture of Portland cement stucco walls can be made as follows.

A composite substantially as shown in FIGS. 1-3 is made by continuously laminating on meter-wide webs of kraft paper with a hexagonally patterned wire mesh using continuous lengths of adhesive coated bands which are bonded intermittently to the uncoated side of the kraft paper in the areas defined by alternate hexagons of the wire mesh. The paper used is 75 lb. asphalt impregnated kraft paper (impregnated on one side, only). The wire mesh is made of 18 gauge wire webs and is slightly less than one meter wide. The adhesive coated bands are oriented parallel to the continuous dimension of the paper and are spaced laterally across the width of the web, approximately every 5 cm. A preferred type of adhesive coated retaining band is made from an elastic, synthetic and relatively untwisted roving of continuous nylon filaments (Codura, Type 965-140-0-Cor, a product of E. I. DuPont deNemours & Company; 965 denier, 140 filaments, zero twist per inch and made by the "Cordura" mechanical texturing process). Preferred types of hot melt adhesives for coating the bands are hot melt adhesives such as commercial product numbers F-5174 and P-4071, which are available commercially from H. B. Fuller Company, St. Paul, Minnesota. Typically, an adhesive coated string made from such nylon strands and such hot melt adhesives will yield approximately 2800 meters of coated string per kilogram of total weight.

Products of the type just described can be manufactured at much higher production speeds than composite products presently being used. For example, manufacturing speeds with the system described are faster in comparison to the prior art hot melt bonding system because there is no large mass of hot melt adhesive to be cooled. Since the rate of cooling for hot melt adhesives has a relationship which is inversely and exponentially proportional to the mass of the hot melt adhesive, a relatively large mass of hot melt adhesive will cool slowly. For example, the preferred hot melt adhesive coated strings can be cooled in a fraction of a second by means of contact with cold shoes, whereas the hot melt shots previously described may require up to ten or more seconds using forced cold air methods for cooling.

If desired, the retaining bands, or some of them, can be color coded so they will very easily delineate the places where a mechanic needs to staple the composite to wood studs for stucco use. This can eliminate the step of painting or printing such lines onto the composite as has been required by some prior art processes.

Compared to the equipment required to bond the mesh and the substrate together using the hot melt shot system, the equipment required to manufacture composites by the present invention can be much simpler and less costly.

A significant advantage of the present system is that the mesh is not rigidly attached to the substrate, but only interlocked by means of the retaining bands. Consequently, the substrate and mesh can expand or contract with changes in atmospheric conditions independently of each other. When the retaining bands are themselves elastic, greater relative motion between substrate and mesh can occur without stressing the system excessively. This prevents the common problem with prior art composites of delamination and/or distortion that occur after prior art products are applied to stud walls and exposed to adverse weather conditions.

Because there tend to be many more and smaller areas of bonding with this system than with the prior art hot melt shot system, the stresses that exist are spread more uniformly across the surface of the composite.

In addition to the economic savings in manufacture, cost savings currently exist in terms of raw materials. Thus, the cost per unit area is less when adhesive coated string is used as the retaining band as contrasted to the use of the hot melt shot system previously described.

What is claimed is:

1. A composite comprising:
   (a) A substrate;
   (b) A mesh overlying said substrate, said mesh being retained upon but not substantially adhesively bonded to said substrate, thereby permitting some lateral movement of the substrate relative to the mesh;
   (c) A plurality of retaining bands overlying said mesh and bonded to said substrate, the loci of bonding being located within the areas of said substrate underlying the holes in said mesh, whereby the mesh is not substantially bonded to the retaining bands; said retaining bands being adhesive coated, generally continuous filaments.

2. A composite of claim 1 in which the substrate is a paper.

3. A composite of claim 2 in which the mesh is a wire mesh.

4. A composite of claim 3 in which the retaining bands are generally parallel to each other.

5. A composite of claim 3 in which the retaining bands are elastic.

6. A composite suitable for use in constructing stucco walls comprising:
   (a) a strong paper backing material of constant width;
   (b) a layer of wire mesh substantially covering the entire width of said paper;
   (c) a plurality of generally parallel longitudinally extending retaining bands in the form of adhesive coated, generally continuous organic polymeric filaments, said strands overlying the wire mesh and being adhesively bonded to said paper through intermittent openings in said mesh to thereby firmly clasp the wire mesh to the backing paper while permitting some limited movement of the backing paper relative to the wire mesh.

7. In the process of making composites wherein a mesh is attached to a substrate, the improvement which comprises the step of securing the mesh to the substrate by passing a plurality of retaining bands over the mesh and bonding intermittent portions of said bands substantially only to the substrate through holes in said mesh, thereby permitting some lateral movement of the substrate relative to the mesh; said retaining bands being adhesive coated, generally continuous filaments.

8. The process of claim 1 in which the substrate is a paper.

9. The process of claim 8 in which the mesh is a wire mesh.

10. The process of claim 1 in which the retaining bands are generally parallel to each other.

* * * * *